United States Patent
Matsukawa et al.

(10) Patent No.: US 8,799,682 B2
(45) Date of Patent: Aug. 5, 2014

(54) CONTENT DATA REPRODUCTION SYSTEM AND RECORDING DEVICE

(75) Inventors: Shinichi Matsukawa, Tokyo (JP); Akihiro Kasahara, Chiba (JP); Hiroshi Suu, Chigasaki (JP); Akira Miura, Sagamihara (JP)

(73) Assignee: Kabushiki Kaisha Toshiba, Tokyo (JP)

(*) Notice: Subject to any disclaimer, the term of this patent is extended or adjusted under 35 U.S.C. 154(b) by 0 days.

(21) Appl. No.: 13/264,448

(22) PCT Filed: Apr. 16, 2009

(86) PCT No.: PCT/JP2009/057688
§ 371 (c)(1),
(2), (4) Date: Dec. 21, 2011

(87) PCT Pub. No.: WO2010/119549
PCT Pub. Date: Oct. 21, 2010

(65) Prior Publication Data
US 2012/0096284 A1 Apr. 19, 2012

(51) Int. Cl.
*G06F 21/00* (2013.01)
*G06F 21/60* (2013.01)
*G06F 12/14* (2006.01)

(52) U.S. Cl.
CPC ............ *G06F 21/00* (2013.01); *G06F 21/606* (2013.01); *G06F 12/1408* (2013.01)
USPC ........................................................ 713/193

(58) Field of Classification Search
CPC ...................................................... G06F 21/60
USPC ............................................................ 713/193
See application file for complete search history.

(56) References Cited

U.S. PATENT DOCUMENTS

2005/0198529 A1  9/2005  Kitani
2010/0208042 A1*  8/2010  Ikeda et al. ..................... 348/53

FOREIGN PATENT DOCUMENTS

CN  1425173 A  6/2003
CN  1957558 A  5/2007
(Continued)

OTHER PUBLICATIONS

International Search Report from Japanese Patent Office for International Application No. PCT/JP2009/057688, Mailed May 26, 2009.
(Continued)

*Primary Examiner* — Hadi Armouche
*Assistant Examiner* — Dao Ho
(74) *Attorney, Agent, or Firm* — Finnegan, Henderson, Farabow, Garrett & Dunner, L.L.P.

(57) ABSTRACT

To exclude any unauthorized device from a system and thereby prevent illegal use of content data, a memory card 10 stores a service key Ksrv for encrypting content key data Kc in a hidden area 14. The memory card 10 stores answer data $A_C$ to be obtained when question data Q is fed to a host function F possessed by an authorized host device 20, with encryption applied to the answer data $A_C$ by the service key Ksrv. When the question data Q is provided to the host device 20, answer data $A_H$ is obtained based on the question data Q and the host function F. A comparison unit 122 judges match or mismatch of the answer data $A_H$ and the answer data $A_C$. When they match, the memory card 10 decrypts the content key data Kc encrypted by the service key Ksrv and sends it to the host device 20.

4 Claims, 8 Drawing Sheets

(56) References Cited

FOREIGN PATENT DOCUMENTS

| | | | |
|---|---|---|---|
| CN | 1977489 A | 6/2007 | |
| CN | 1977490 A | 6/2007 | |
| WO | WO 2005/117332 A1 | 12/2005 | |
| WO | WO 2006/001161 A1 | 1/2006 | |
| WO | WO 2006/003778 A1 | 1/2006 | |
| WO | WO 2006/006326 A1 | 1/2006 | |
| WO | WO 2006/008909 A1 | 1/2006 | |
| WO | WO 2007/129434 A1 | 11/2007 | |
| WO | WO 2008/139670 A1 | 11/2008 | |

OTHER PUBLICATIONS

First Office Action issued by the State Intellectual Property Office of the People's Republic of China on Sep. 27, 2013, for Chinese Patent Application No. 200980158692, and English-language translation thereof.

* cited by examiner

CONTENT DATA REPRODUCTION SYSTEM AND RECORDING DEVICE

TECHNICAL FIELD

The present invention relates to a content data reproduction system capable of reproducing content data while eliminating unauthorized use of the content data, and a recording device used therefor.

BACKGROUND ART

With the recent development of the information society, a content data reproduction system is widely used that delivers to a user terminal content data such as electronic books, newspapers, music, and motion pictures and the like and allows the content data to be available.

Since the electronized content data (hereinafter referred to simply as "content data") is easily duplicatable, illegal activities disregarding copyright may easily occur. From a point of view of protecting content data from such illegal activities, the content data is usually encrypted with an encryption key and is recorded, while it is decrypted when it is reproduced. Content Protection for Prerecorded Media (CPRM) is one of such content data protection technologies. Another proposed technique is a double-key encryption technique which encrypts a content key doubly by two keys (see e.g., Patent Document 1). A double-key encryption technique of this type is used in, for example, MQbic®. Of the encryption keys, a key unique to a recording medium, for example, a medium-unique key is securely stored in a hidden area of the recording medium and made completely inaccessible from outside. Hence, for example, if a committer of illegal copying illegally copies only encrypted content key data, he or she cannot use the content data unless he or she has the medium-unique key.

However, if the medium-unique key is somehow read out illegally and given away to a host manufacturer who has not got a formal license, it is likely that the content data will be used illegally with an unauthorized device that is manufactured based on the leaked information.

CONVENTIONAL ART DOCUMENT

Patent Document

Patent Document 1: JP2005-341156A

DISCLOSURE OF INVENTION

Problem to be Solved by the Invention

An object of the present invention is to provide a content data reproduction system and a recording device capable of preventing illegal use of content data by excluding any unauthorized device from the system.

Means for Solving the Problem

A content data reproduction system according to one aspect of the present invention includes: a host device configured to use content data; and a recording device configured to decrypt encrypted content data to allow the content data to be used in the host device, the encrypted content data being content data encrypted by content key data. The recording device includes: a storage unit configured to store a service key for encrypting the content key data, encrypted content key data which is the content key data encrypted by the service key, and encrypted output data which is first output data encrypted by the service key, the first output data being obtained when input data is calculated by using a host function possessed by an authorized host device; a comparison unit configured to provide the input data to the host device, receive from the host device second output data obtained by the host device based on the input data and the host function, and compare the second output data with the first output data; and a data processing unit configured to decrypt the encrypted content key data by using the service key to obtain the content key data, when the comparison unit detects that the first output data and the second output data match each other. The storage unit is configured to store the service key in a hidden area inaccessible by the host device. The host device includes a first conversion unit configured to obtain the second output data based on the input data and the host function.

A recording device according to one aspect of the present invention is provided in cooperation with a host device, and configured to be capable of decrypting encrypted content data to allow content data to be used in the host device, the encrypted content data being content data encrypted by content key data, the recording device including: a storage unit configured to store a service key for encrypting the content key data for encrypting the content data, encrypted content key data which is the content key data encrypted by the service key, input data to be fed to a host function possessed by an authorized host device, and encrypted output data which is first output data encrypted by the service key, the first output data being obtained when the input data is fed to the host function; a comparison unit configured to provide the input data to the host device, receive second output data obtained by the host device based on the input data and the host function, and compare the second output data with the first output data; and a decryption processing unit configured to decrypt the encrypted content key data by using the service key to obtain the content key data, when the comparison unit detects that the first output data and the second output data match each other. The storage unit is configured to store the service key in a hidden area inaccessible by the host device.

Effect of the Invention

According to the present invention, it is possible to provide a content data reproduction system and a recording device capable of excluding any unauthorized device from the system, thereby preventing illegal use of content data.

BEST MODE FOR CARRYING OUT THE INVENTION

Next, the embodiments of the present invention will be explained in detail with reference to the drawings.

[First Embodiment]

Figure 1:
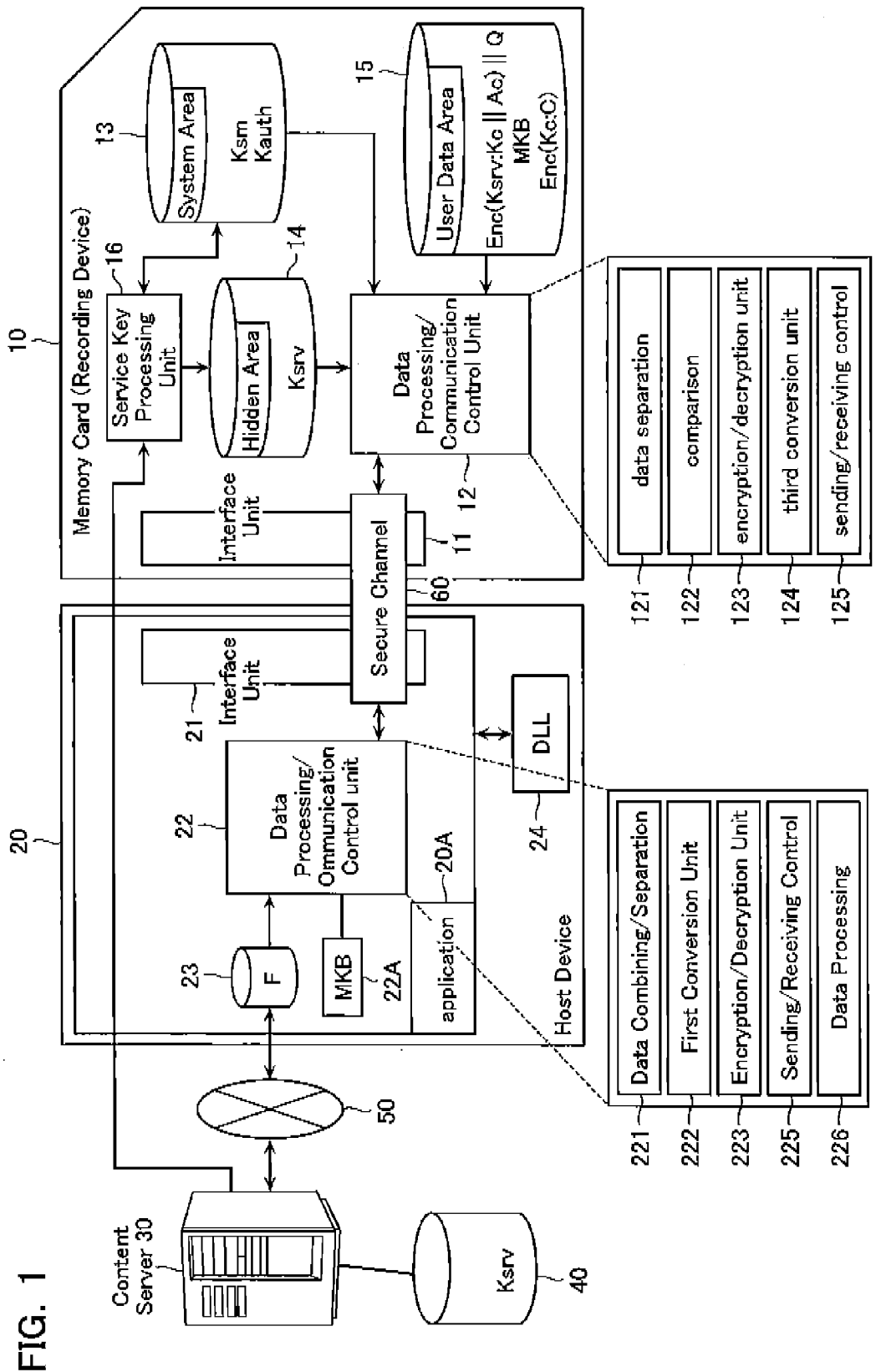
FIG. 1 is a block diagram showing an entire structure of a content data reproduction system according to a first embodiment of the present invention.

FIG. 1 is a block diagram showing the entire structure of a content data reproduction system according to a first embodiment of the present invention. The system includes a memory card (a recording device) 10 which securely stores content key data for encrypting content data, etc., and a host device 20 which reproduces content data by, in cooperation with the memory card 10, obtaining the content key data after an authentication process described later. The host device 20 is capable of exchanging data with a content server 30 and a key database 40 through a network 50.

The memory card 10 and the host device are connected through a secure channel 60 and capable of securely exchanging data in accordance with AKE (Authentication and Key Exchange)

The memory card 10 includes an interface unit 11, a data processing/communication control unit 12, a system area 13, a hidden area 14, a user data area 15, and a service key processing unit 16.

The interface unit 11 is a unit in charge of controlling input/output of various data to be exchanged with the host device 20 through the secure channel 60.

The data processing/communication control unit 12 is a unit in charge of various data processes described later (data separation, comparison/judgment, data conversion, encryption/decryption), and control on sending/receiving of the processed data. The data processing/communication control unit 12 includes a data separation unit 121, a comparison unit 122, an encryption/decryption unit 123, a third conversion unit 124, and a sending/receiving control unit 125. As will be described later, the data separation unit 121 has a function of separating linked data composed of mutually-relevant linked pieces of data.

The comparison unit 122 is a unit which, as will be described later, compares answer data $A_C$ possessed by the memory card 10 with answer data $A_H$ calculated by the host device 20 and judges match or mismatch of these pieces of answer data. The encryption/decryption unit 123 has a function of encrypting plain-text data provided thereto and decrypting encrypted data provided thereto. The third conversion unit 124 applies a one-way function or the like to data provided thereto to convert the data into irreversible data. The sending/receiving control unit 125 is a unit in charge of encryption using a session key Ks generated based on AKE (Authentication and Key Exchange), and data exchange with the host device 20.

The system area 13 is an area accessible from the outside of the recording device 10, and stores a storage medium key Ksm to be used when obtaining a service key Ksrv described later, an authentication key Kauth to be used for an authentication process with the host, etc.

The hidden area 14 is an area writable only by a content server 30 which has passed a predetermined authentication process, and otherwise completely inaccessible from the outside. According to the present embodiment, a service key Ksrv used for protecting content key data Kc is stored in the hidden area 14 to be invisible from the outside. The service key Ksrv is written therein by a memory card maker when the memory card 20 is manufactured, or written therein after manufacture/shipping by a key distribution server by using an authentication process using the storage medium key Ksm described above, a PKI authentication process, or the like. The method of writing the service key Ksrv is not limited to a specific one.

The user data area 15 is an area freely writable/readable from the outside of the recording medium 30. According to the present embodiment, the user data area 15 stores encrypted content data Enc(Kc:C), i.e., content data C encrypted by the content key data Kc, and in addition, encrypted content key data Enc(Ksrv:Kc), i.e., the content key data Kc encrypted by the service key Ksrv. Moreover, the user data area 15 stores question data Q (input data) to be input into a host function F possessed by an authorized host device 20, and encrypted answer data Enc(Ksrv:Ac), i.e., answer data Ac (first output data) which is to be obtained when the question data Q is input into the host function F and which is encrypted by the service key Ksrv. For association purposes, these encrypted content key data Enc(Ksrv:Kc), question data Q, and encrypted answer data Enc (Ksrv:Ac) are stored as linked data Enc (Ksrv: Kc||Ac)||Q obtained by linking these pieces of data together. (Here, Enc(A:B||C) represents that linked pieces of data B and C are encoded with the use of a single piece of key data A. The sign "||" represents that the pieces of data shown on the left and right-hand sides thereof are concatenated.)

For preventing illegal copy, data called MKB (Media Key Block) is used and stored in the user data area 15. The MKB is a medium key encrypted by an aggregate of device keys (Kd) set in respective host devices as secret keys. The medium key is a base key for encrypting content data. The MKB also includes information about unauthorized devices so that the unauthorized devices cannot acquire the medium key. Note that the encrypted content data Enc(Kc:C) needs not be stored in the user data area 15 but may be stored in the host device 20.

The service key processing unit 16 has a function of writing a service key Ksrv in the hidden area 14 through a certain process, when it receives the service key Ksrv distributed from the content server 30. The service key Ksrv is used only in the memory card 10, and never given away to the outside once written from the content server 30.

The host device 20 has an application program 20A. The host device 20 forms, in the application program 20A, an interface unit 21, a data processing/communication control unit 22, and a data storage area 23. The interface unit 21 is a unit in charge of controlling input/output of various data to be exchanged with the memory card 10 through the secure channel 60.

The data processing/communication control unit 22 is a unit in charge of various data processes described later (data separation and data conversion) and control on sending/receiving of the processed data. The data processing/communication control unit 22 includes a data combining/separation unit 221, a first conversion unit 222, an encryption/decryption unit 223, and a sending/receiving control unit 225. The data processing/communication control unit 22 also includes an MKB processing unit 22A in charge of processing MKB (Media Key Block).

As will be described later, the data combining/separation unit 221 has a function of combining (linking) mutually relevant pieces of data and separating linked data received.

The first conversion unit 222 has a function of inputting question data Q provided thereto into a host function F to convert it into answer data $A_H$. The encryption/decryption unit 223 has a function of encrypting plain-text data provided thereto and decrypting encrypted data provided thereto. The sending/receiving control unit 225 is a unit in charge of encrypting the data by using a session key Ks generated by AKE (Authentication and Key Exchange) or the like, and exchanging data with the memory card 10.

The data storage area 23 stores a host function executing program for executing the host function F described in detail later, content key data Kc acquired, and the like. The host function executing program stored in the data storage area 23 may be a self-contained program. Alternatively, some part of its functions may be provided from a Dynamic Link Library (DLL) execution unit 24 in the form of a DLL, as shown in FIG. 1. The DLL execution unit 24 loads the DLL, thereby causing the DLL to operate integrally with the program stored in the data storage area 23. That is, they function as a single piece of software as a whole.

As can be understood from the above, an authorized host device 20 possesses a host function executing program for executing the host function F, while the memory card 10 possesses question data Q as data to be input into the host function F which an authorized host device 20 is supposed to possess, and answer data $A_C$ as data to be output as a result. The host device 20 inputs question data Q provided by the memory card 10 into the host function F to obtain answer data $A_H$, and returns the answer data $A_H$ to the memory card 10. The memory card 10 compares the received answer data $A_H$ with the answer data $A_C$ possessed in itself. When both the pieces of data match each other, the memory card 10 decrypts the content key data Kc encrypted by the service key Ksrv and sends the decrypted content key data Kc to the host device 20.

On the other hand, an unauthorized host device does not possess such a host function F, and hence even when provided with the question data Q, cannot obtain answer data, and hence nor the content key data Kc, either. Therefore, according to the present embodiment, it is possible to exclude use of any unauthorized device. The host function F is provided in an authorized host device in the form of a program to be executed. Unlike ordinary data, the host function F is difficult to be deplicated in an easy way, and used without authority. The host function executing program becomes even harder to be deplicated when it is formed by using an add-on DLL as in the example described above.

Furthermore, for preventing illegal copy, data called MKB (Media Key Block) is used. The MKS is a medium key encrypted by an aggregate of device keys (Kd) set in respective host devices as secret keys. The medium key is a base key for encrypting content data. The MKB also includes information about unauthorized devices so that the unauthorized devices cannot acquire the medium key.

Next, a process for the host device 20 to acquire the content key data Kc according to the present embodiment, and the operations of the respective units in this process will be explained with reference to FIG. 2.

Figure 2:
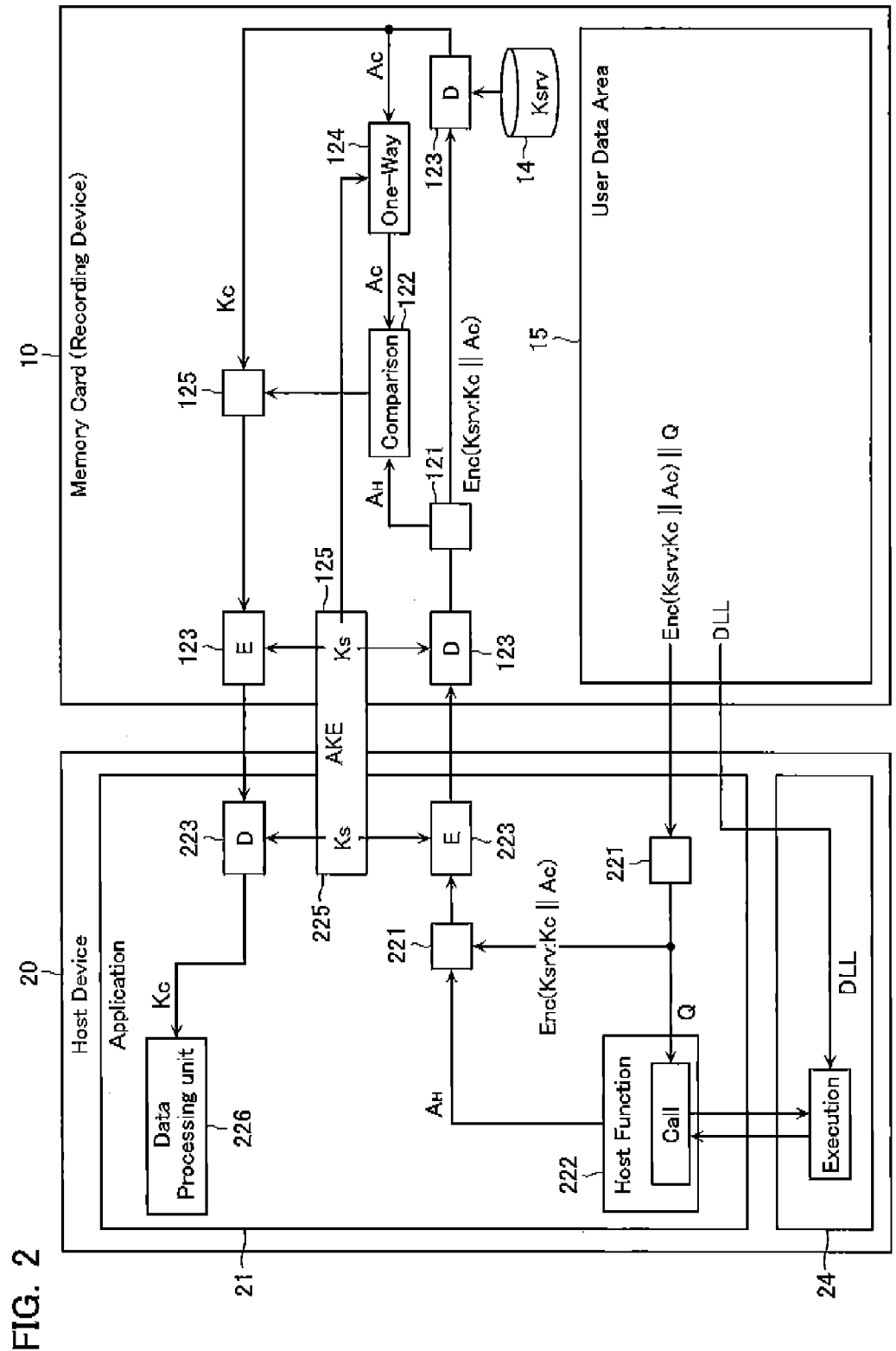
FIG. 2 explains a process for a host device 20 to acquire content key data Kc according to the first embodiment, and the operation of each unit in the process.

When the host device 20 gives a request for reproduction of certain content data C, the memory card 10 sends linked data Enc(Ksrv:Kc∥$A_C$)∥Q that includes the content key data Kc corresponding to that content data C to the requesting host device 20 through the data processing/communication control unit 12 and the secure channel 60 (not illustrated in FIG. 2).

The data combining/separation unit 221 of the host device 20 separates the question data Q from the encrypted data Enc(Ksrv:Kc∥$A_C$). The separated question data Q is input to the first conversion unit 222, and answer data $A_H$ is generated based on the host function F.

The data combining/separation unit 221 combines the answer data $A_H$ and the encrypted data Enc (Ksrv:Kc∥$A_C$). The resulting composite data Enc(Ksrv:Kc∥$A_C$)∥$A_H$ is encrypted by the encryption/decryption unit 223 with the use of the session key Ks, and sent to the memory card 10. In the memory card 10, the encryption/decryption unit 123 decrypts this encrypted data by using the session key Ks. The data separation unit 121 separates the decrypted composite data Enc(Ksrv: Kc∥$A_C$)∥$A_H$ and thereby obtains the encrypted data Enc(Ksrv:Kc∥$A_C$) and the answer data $A_H$. The encryption/decryption unit 123 decrypts the encrypted data Enc(Ksrv: Kc∥$A_C$) by using the service key Ksrv, and thereby obtains the content key data Kc and the answer data $A_C$.

The comparison unit 122 compares the obtained answer data $A_C$ and answer data $A_H$. When both the pieces of data match each other, the comparison unit 122 outputs a match signal to the sending/receiving control unit 125. On receiving the match signal, the sending/receiving control unit 125 instructs the encryption/decryption unit 123 to encrypt the decrypted content key data Kc by using the session key Ks, and sends the encrypted content key data Kc to the host device 20. The host device 20 decrypts the content key data Kc by using the session key Ks. A data processing unit 226 stores the content key data Kc in a certain storage unit, and thereby this process is finished.

As can be understood from the above, by possessing the host function executing program capable of executing a calculation based on the host function F, the host device 20 can obtain answer data $A_H$ based on the provided question data Q, and then the content key data Kc based on this answer data $A_H$. Replication of such data as behaving like a program is difficult because it requires a program analysis. By introducing a scheme for executing such a program, it is possible to exclude unauthorized devices effectively.

[Second Embodiment]

Figure 3:
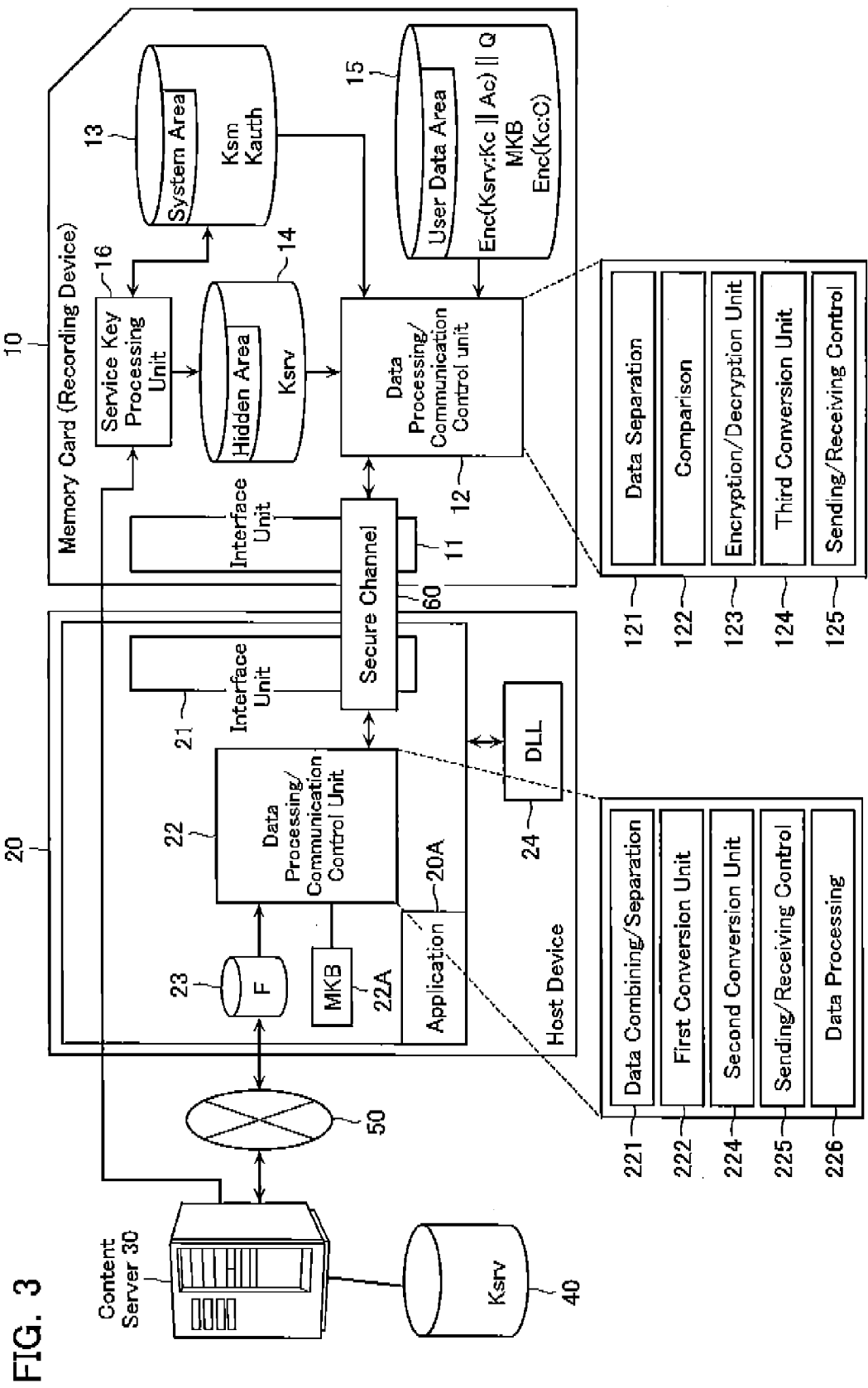
FIG. 3 is a block diagram showing an entire structure of a content data reproduction system according to a second embodiment of the present invention.
Figure 4:
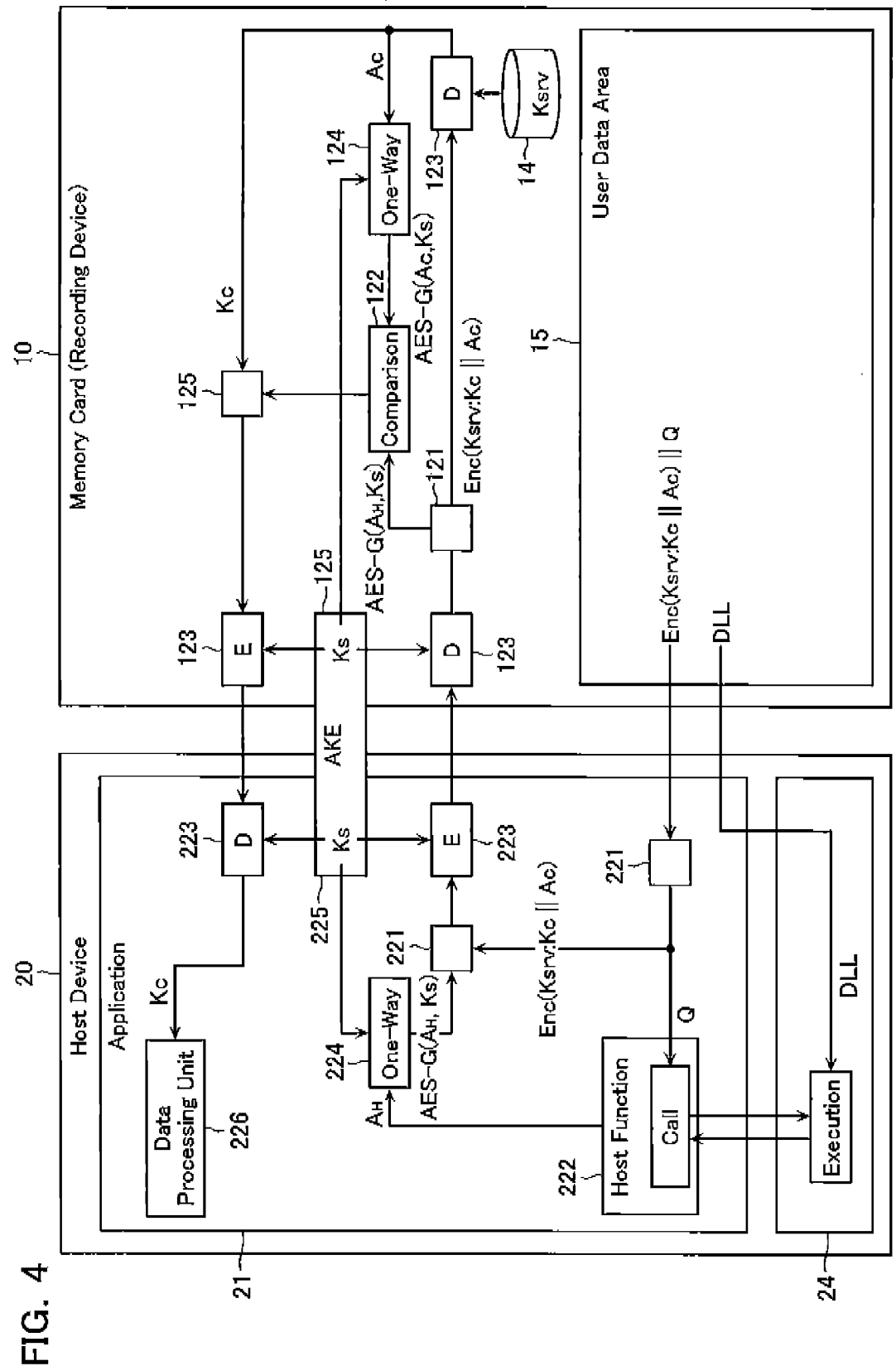
FIG. 4 explains a process for a host device 20 to acquire content key data Kc according to the second embodiment, and the operation of each unit in the process.

Next, a content data reproduction system according to a second embodiment of the present invention will be explained with reference to FIG. 3 and FIG. 4. The entire structure of the system is substantially the same as shown in FIG. 1, and the same components are denoted by the same reference numerals. Therefore, a detailed explanation about them will not be provided.

The difference from the first embodiment is that there is provided a second conversion unit 224. The second conversion unit inputs, together with the session key Ks, the answer data $A_H$ output by the first conversion unit 222 into a one-way function and thereby obtains converted data AES-G($A_H$, Ks).

Likewise, the third conversion unit 124 of the memory card 10 is configured to execute an operation of inputting the answer data $A_C$ and the session key Ks into a one-way function to obtain converted data AES-G($A_C$, Ks). Then, these pieces of converted data are compared by the comparison unit 122. In this way, match or mismatch of the answer data $A_C$ and the answer data $A_H$ is judged. The second embodiment is the same as the first embodiment in any other points.

[Third Embodiment]

Next, a content data reproduction system according to a third embodiment of the present invention will be explained with reference to FIG. 5 to FIG. 9. The entire structure of the system according to the present embodiment is substantially the same as shown in FIG. 1, and a detailed explanation will not be provided.

Figure 5:
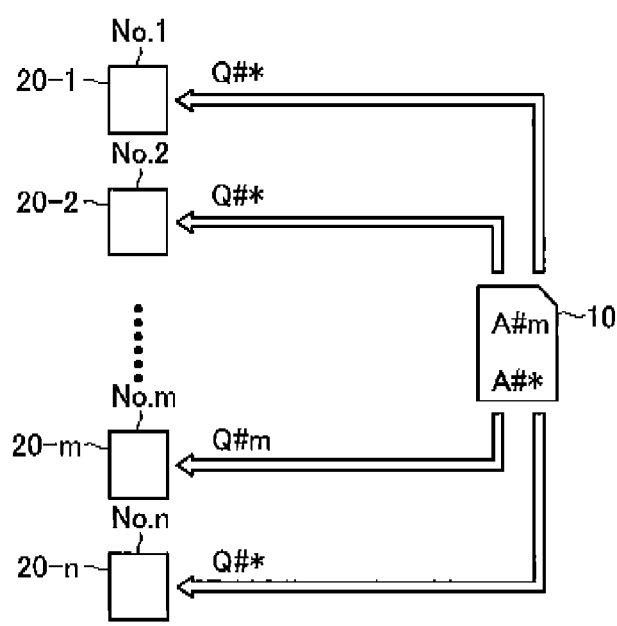
FIG. 5 is a concept diagram explaining an outline of an authentication process in a content data reproduction system according to a third embodiment of the present invention.

In the system according to the present embodiment, among a plurality of host devices 20-1, 20-2, . . . and 20-n, a specific host device 20-m can use an input and an output which can be calculated only by a host function provided in that host device, while the other host devices 20-i (i≠m) can use an input and an output which can be calculated by all of the host devices. In this way, different host devices may be provided with different input and output to be used in an authentication process. This may inspect on one by one basis installation of a host function in a host device. This process also may achieve secure exclusion of a specific unauthorized device. Specifically, as shown in FIG. 5, a specific host device 20-m is provides with question data Q#m and answer data A#m. The question data Q#m and answer data A#m may satisfy a relationship of A#m=F#m (Q#m) only in a host function F#m that is supposed to be held in the specific host device 20-m. The question data Q#m is provided to the host device 20-m to let the host device 20-m return answer data. Because the host device 20-m must possess the specific host function F#m, the authentication process for the host device 20-m becomes stricter than that for the other host devices.

On the other hand, question data Q#* is provided to the other host devices 20-i (i≠m). The question data Q#* allows any host function F#* to result in the same answer data A#* (A#*=F(Q#*)). In other words, the question data Q#* provides the same answer data A#* whichever host function F it is input into. Hence, it is possible to ease the authentication process for the other host devices 20-i compared to that for the specific host device 20-m (i.e., the host device 20-i in question needs only to possess some host function whatsoever, and the kind of the function is overlooked). Hence, it is possible to switch the scheme and strictness of the authentication process from host device to host device.

Figure 6:
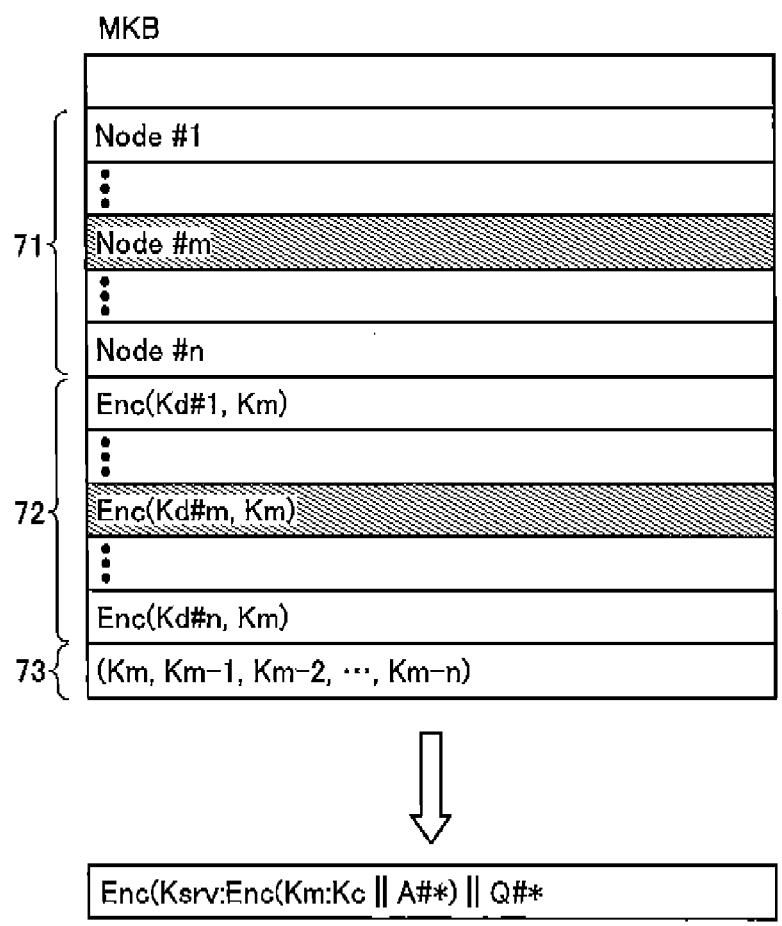
FIG. 6 shows an example structure of MKB (Media Key Block) used in the content data reproduction system according to the third embodiment of the present invention.

For switching the host-function-F-based authentication process, the present system has such an MKB structure as shown in FIG. 6.

First, the MKB includes a host node number storage section 71 which stores host node numbers (Node#1, Node#2, . . . , and Node#n) of the host devices 20.

The MKB also includes, in the form of data, a common medium key Km used for the plurality of host devices 20-1 to 20-n in common. The common medium key Km is encrypted by device keys Kd#1, Kd#2, . . . , and Kd#n unique to the respective host devices, and stored in an encrypted common medium key storage section 72 as encrypted common medium keys Enc(K#m, Km) (m=1 to n).

The MKB also includes, in the form of data, individual medium keys Km-1, Km-2, . . . and Km-n unique to the host devices respectively. The individual medium keys Km-1, Km-2, and . . . , Km-n, are stored in an individual medium key storage section 73.

(A) Case 1

Figure 7:
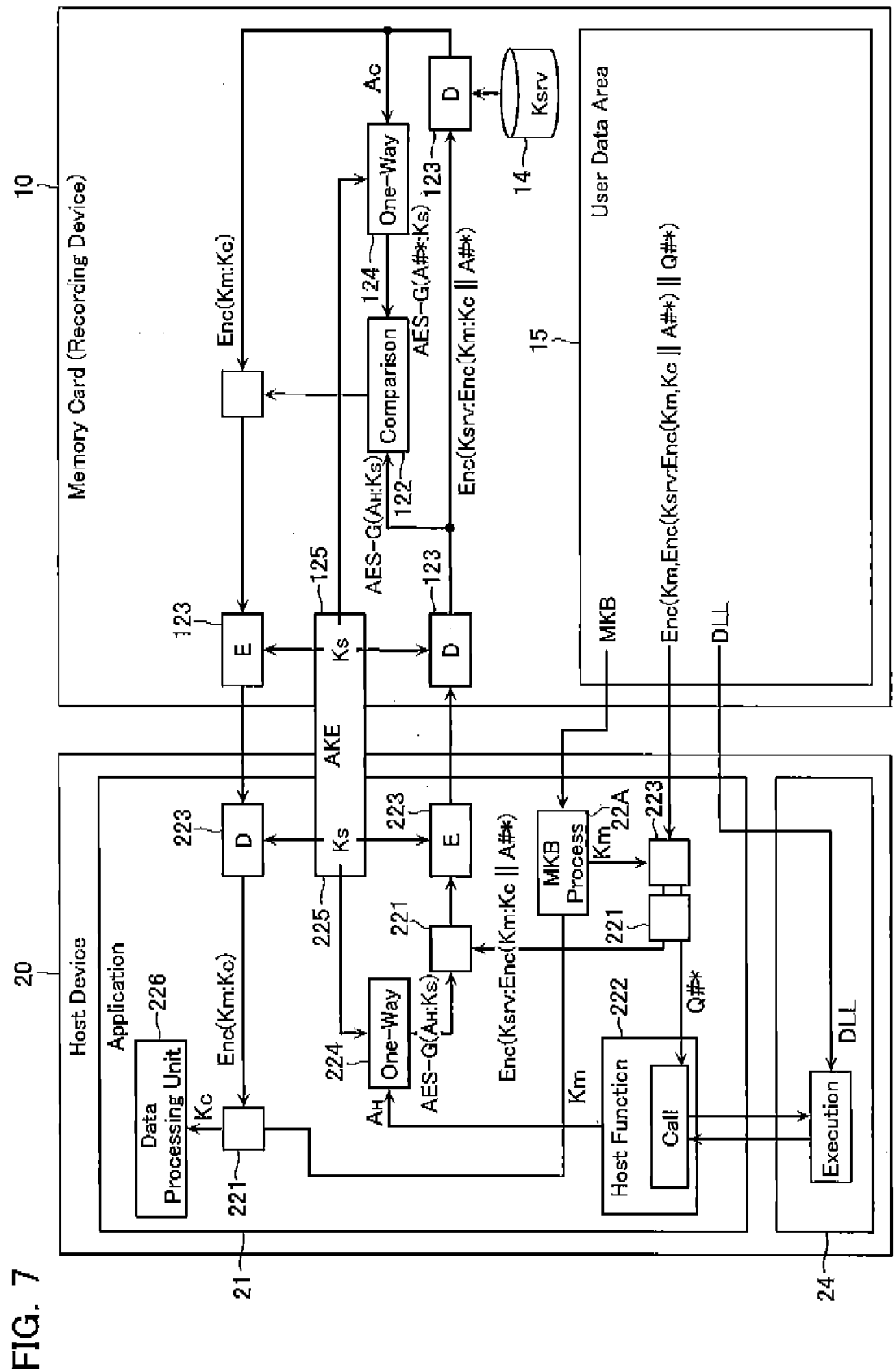
FIG. 7 shows the operation of each unit when a common authentication process is executed in the content data reproduction system according to the third embodiment of the present invention.

A case when this MKB structure is prepared such that the same input and output to be fed to and returned from the host function are used for all of the host devices 20-1, 20-2, . . . , and 20-n will now be explained with reference to FIG. 7. In this case, the content key data Kc and the answer data $A_C$ are encrypted and stored in the user data area 15 in accordance with the following process.

(1) The content key data Kc is encrypted by the common medium key Km to generate encrypted content key data Enc (Km:Kc).

(2) The encrypted content key data Enc(Km:Kc) is linked with answer data A#* and question data Q#*, and then the resulting linked data is encrypted by the service key Ksrv to obtain encrypted data Enc(Ksrv:Enc(Km:Kc)‖A#*‖Q#*). This data is further encrypted by the common medium key Km and stored in the user data area 15.

The MKB having this data structure is stored in the user data area 15 of the memory card 10. When the host device 20-m accesses the memory card 10 under this condition to request distribution of the content key data Kc, the memory card 10 provides this MKB to the MKB processing unit 22A of the host device 20-m. The MKB processing unit 22A decrypts the common medium key Km in the storage section 72 by using its own device key Kd#m, and then by using this common medium key Km, decrypts the encrypted data Enc (Km:Enc(Ksrv:Enc(Km:Kc)‖A#*‖Q#*) in the user data area 15 to obtain the data Enc(Ksrv:Enc(Km:Kc)‖A#*‖Q#*.

The data separation unit 221 separates the question data Q#* and provides it to the first conversion unit 222, which then obtains answer data $A_H$. Any other operations are the same as in the embodiment described above.

(B) Case 2

Figure 8:
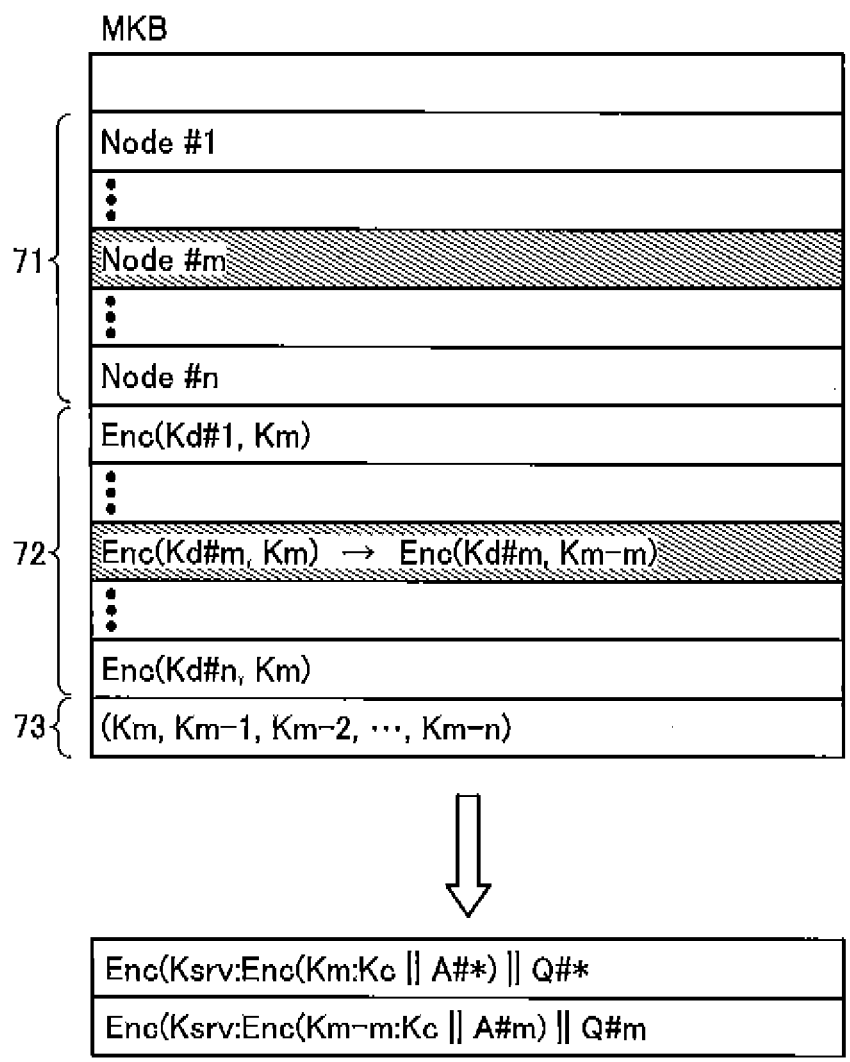
FIG. 8 shows an example structure of MKB (Media Key Block) used in the content data reproduction system according to the third embodiment of the present invention.
Figure 9:
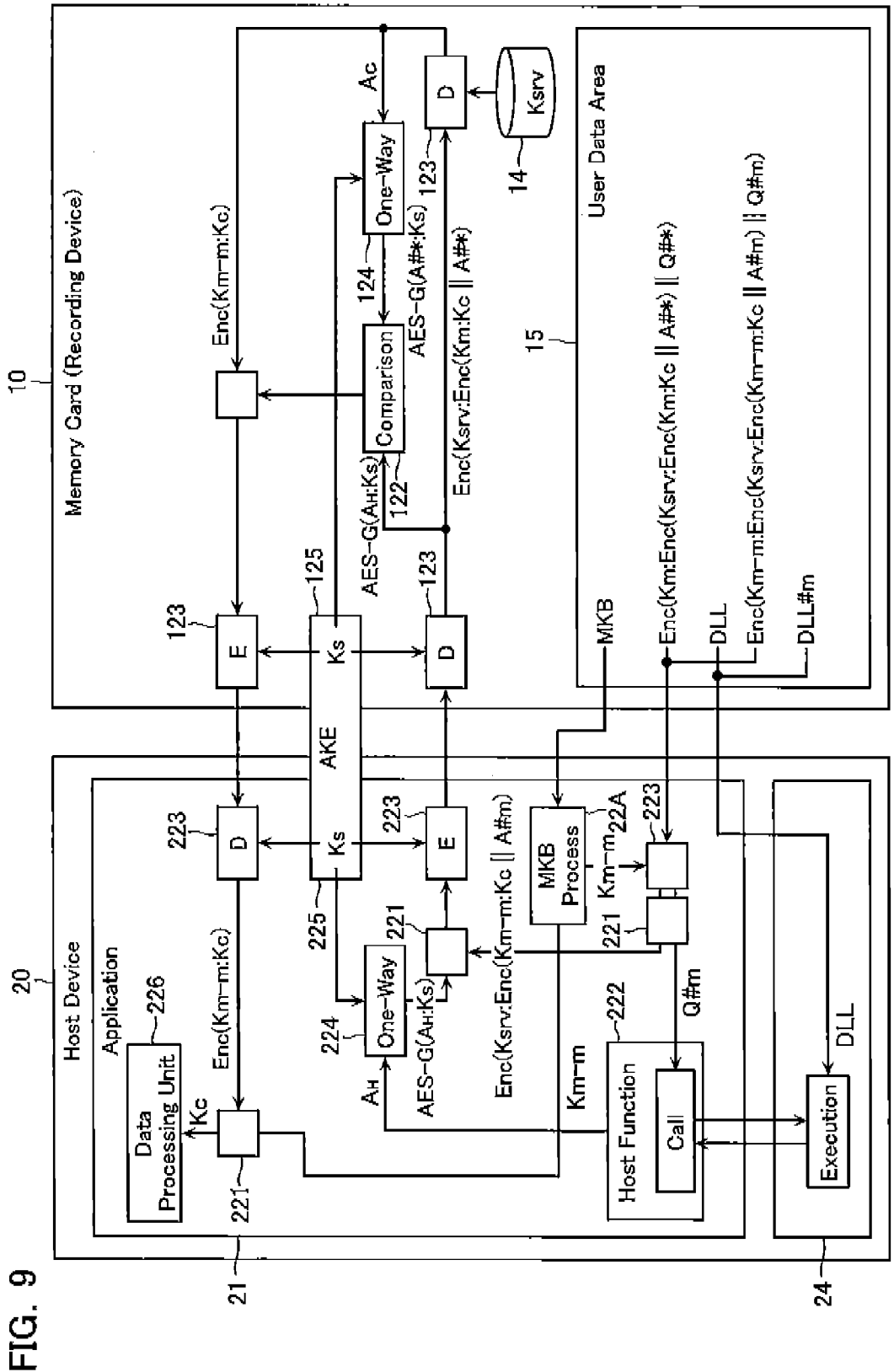
FIG. 9 shows the operation of each unit when different authentication processes are executed for different hosts in the content data reproduction system according to the third embodiment of the present invention.

An operation of a case when the question used for a specific host device 20-m is different from the question used for any other host devices will be explained with reference to FIG. 8 and FIG. 9. In this case, encrypted data Enc(Ksrv:Enc(Km: Kc)‖A#*‖Q#*) is generated for the other host devices 20-i (i≠m), while encrypted data Enc(Ksrv:Enc(Km-m:Kc) ‖A#m‖Q#m) is generated for the specific host device 20-m. Furthermore, the encrypted common medium key data Enc (Kd#m:Km) stored in the encrypted common medium key storage section 72 is rewritten to encrypted individual medium key data Enc(Kd#m:Km-m).

An operation of a case when the specific host device 20-m requests distribution of the content key data Kc when such an MKB is prepared will be explained with reference to FIG. 9. In this case, the MKB processing unit 22A obtains the individual medium key Km-m by using its own device key Kd#m and thereby decrypts the data Enc(Km-m:Enc(Ksrv-m:Enc (Km-m:Kc)‖A#m‖Q#m) to obtain the encrypted data Enc (Ksrv:Enc(Km-m:Kc)‖A#m‖Q#m, and separates the question data Q#m and provides it to the first conversion unit 222. This question data Q#m results in answer data A#m being output only when it is input into a specific host function F#m, and results in different answer data being output when input into other host functions F#. Accordingly, in the host device 20-m, the function of the host device 20-m is inspected by question data and answer data different from those for the other host devices 20-i (i≠m).

Though the embodiments of the invention having been described, the present invention is not limited to them, but various modifications, additions, etc. can be made thereunto without departing from the scope of the spirit of the invention.

DESCRIPTION OF REFERENCE NUMERALS 10 memory card
11 interface unit
12 data processing/communication control unit
13 system area
14 hidden area
15 user data area
16 service key processing unit
20 host device
21 interface unit
22 data processing/communication control unit
22A MKB processing unit
23 data storage unit
24 DLL execution unit 30 content server
40 key database
50 network
71 host node number storage section
72 encrypted common medium key storage section
73 individual medium key storage section
121 data separation unit
122 comparison unit
123 encryption/decryption unit
124 third conversion unit
125 sending/receiving control unit
221 data separation unit
222 first conversion unit
223 encryption/decryption unit
224 second conversion unit
225 sending/receiving control unit
226 data processing unit

The invention claimed is:

1. A content data reproduction system, comprising:
a host device configured to use content data; and
a recording device external to the host device configured to decrypt an encrypted content data to allow the content data to be used in the host device, the encrypted content data being content data encrypted by content key data, the recording device comprising:
a first storage area that stores, in a hidden area inaccessible by the host device, a service key;
a second storage area that stores an encrypted content key data which is the content key data encrypted by the service key, and an encrypted output data which is a first output data encrypted by the service key; and
a processor configured to:
provide input data to the host device;
convert the first output data to first converted data by inputting the first output data and session key data into a one-way function;
receive from the host device second converted data obtained by the host device based on the input data, a host function, and the session key data;
decrypt the encrypted content key data by using the service key to obtain the content key data; and
compare the second converted data with the first converted data, wherein when, based on the comparison, the processor determines that the first converted data and the second converted data match each other, the processor is further configured to:
encrypt the decrypted content key data using the session key; and
send the content key data encrypted by the session key to the host device.

2. The content data reproduction system according to claim 1, wherein the host device is configured to be capable of executing an executing program for executing a calculation based on the host function.

3. The content data reproduction system according to claim 2, wherein a part of the executing program is provided in a form of a Dynamic Link Library (DLL).

4. A recording device external to a host device, provided in cooperation with the host device, and configured to be capable of decrypting an encrypted content data to allow content data to be used in the host device, the encrypted content data being content data encrypted by content key data, the recording device comprising:
a first storage area that stores, in a hidden area inaccessible by the host device, a service key;
a second storage area that stores an encrypted content key data which is the content key data encrypted by the service key, input data to be fed to a host function possessed by an authorized host device, and an encrypted output data which is first output data encrypted by the service key; and
a processor configured to:
provide the input data to the host device;
convert the first output data to first converted data by inputting the first output data and session key data into a one-way function;
receive second converted data obtained by the host device based on the input data, the host function, and the session key data;
decrypt the encrypted content key data by using the service key to obtain the content key data; and
compare the second converted data with the first converted data, wherein when based on the comparison, the processor determines that the first converted data and the second converted data match each other, the processor is further configured to:
encrypt the decrypted content key data using the session key; and
send the content key data encrypted by the session key to the host device.

* * * * *

UNITED STATES PATENT AND TRADEMARK OFFICE
CERTIFICATE OF CORRECTION

| | | |
|---|---|---|
| PATENT NO. | : 8,799,682 B2 | Page 1 of 1 |
| APPLICATION NO. | : 13/264448 | |
| DATED | : August 5, 2014 | |
| INVENTOR(S) | : Matsukawa et al. | |

It is certified that error appears in the above-identified patent and that said Letters Patent is hereby corrected as shown below:

On the Title page, item (57), in the Abstract, line 5, change "$A_c$to" to --$A_c$ to--.

Signed and Sealed this
Eleventh Day of November, 2014

Michelle K. Lee
*Deputy Director of the United States Patent and Trademark Office*